US008862104B2

(12) United States Patent
Mian et al.

(10) Patent No.: US 8,862,104 B2
(45) Date of Patent: Oct. 14, 2014

(54) SYSTEM AND METHOD FOR GESTURE-BASED MANAGEMENT

(75) Inventors: Mubashir A. Mian, Santa Clara, CA (US); Rita H. Wouhaybi, Portland, OR (US); Stanley Mo, Portland, OR (US); Tobias M. Kohlenberg, Portland, OR (US); Jim S. Baca, Corrales, NM (US); David Stanasolovich, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 13/537,328

(22) Filed: Jun. 29, 2012

(65) Prior Publication Data

US 2014/0004834 A1    Jan. 2, 2014

(51) Int. Cl.
*H04M 3/42* (2006.01)

(52) U.S. Cl.
USPC ........ 455/414.1; 455/557; 455/566; 715/863; 715/864; 345/169; 345/173

(58) Field of Classification Search
USPC ............... 455/566, 567, 414.1; 715/863, 864; 345/169, 173
See application file for complete search history.

(56) References Cited

U.S. PATENT DOCUMENTS

| 2009/0053997 | A1 | 2/2009 | Jobling et al. |
| 2009/0264161 | A1 | 10/2009 | Usher et al. |
| 2010/0068998 | A1* | 3/2010 | Zyambo et al. ............. 455/41.1 |
| 2010/0137027 | A1 | 6/2010 | Kim |
| 2012/0028686 | A1 | 2/2012 | Shin et al. |
| 2012/0282905 | A1* | 11/2012 | Owen ........................ 455/414.1 |
| 2012/0284012 | A1* | 11/2012 | Rodriguez et al. ................ 704/1 |

FOREIGN PATENT DOCUMENTS

WO    2014/004382 A1    1/2014

OTHER PUBLICATIONS

International Search Report and Written Opinion received for PCT Patent Application No. PCT/US2013/047337, mailed on Nov. 1, 2013, 12 pages.
Viola et al., "Rapid Object Detection Using a Booted Cascade of Simple Features", Accepted Conference on Computer Vision and Pattern Recognition 2001, 9 pages.

* cited by examiner

*Primary Examiner* — Khalid Shaheed
(74) *Attorney, Agent, or Firm* — Grossman, Tucker, Perreault & Pfleger, PLLC (57) ABSTRACT

A system includes a first mobile device configured to initiate communication with at least one other mobile device. The first mobile device includes a status indicator configured to provide a persistent visual indication to a user of the status of a mute function of the first user device during the active communication. The first mobile device further includes a user interface configured to receive predefined user input and allow the user to toggle between mute and un-mute states based on the user input regardless of whether a display of the device is shut off and/or the user interface is locked.

21 Claims, 8 Drawing Sheets

SYSTEM AND METHOD FOR GESTURE-BASED MANAGEMENT

FIELD

The present disclosure relates to communication and interaction, and, more particularly, to a system and method for managing active voice and/or video calls by performing gestures.

BACKGROUND

As portable electronic devices have become more compact and the variety of functions performed by such devices has increased, it has become a challenge to design a user interface that allows users to easily interact with such electronic devices. It may be particularly challenging to design a simple user interface for portable electronic devices, such as, for example, smartphones, (e.g., iPhones®, Android®-based phones, Blackberries®, Symbian®-based phones, Palm®-based phones, etc.), which have much smaller screens than desktop or laptop computers.

Current portable electronic devices, such as smartphones, may include touch-sensitive displays (also known as "touch screens" or "touchscreens"), in addition to, or as an alternative to, physical push-buttons. The touch screen generally displays graphics and text, as well as provides a user interface (e.g., but not limited to graphical user interface (GUI)) through which a user may interact with the device (e.g. access applications stored thereon, place voice and/or video communication calls, etc). In addition to permitting users to make simple phone calls, current smartphones may permit users to communicate via video. The user interface generally allows the user to manage voice and video communications with others.

For example, the user interface may provide the user with a phone application display during an active phone call, wherein the user interface may provide a user with the ability to place callers on hold, add new callers, conference two callers together, swap between phone lines, as well as mute the user's end of the communication. For example, upon initiating communication with others, such as a conference call, the user may activate a mute function, thereby preventing transmission of audible sound from the user's end. The parties on the other end of the call will not hear the audio occurring on the user's end until the user deactivates the mute function.

Some current smartphones may include energy saving modes in which the touchscreen display may automatically shut off during periods of inactivity and the user interface may lock. As such, during a phone call, it may be a common occurrence that the display shuts off in order to conserve battery life, however the call remains active and the user may continue communicate with the other parties. This may be problematic in the event that the user activated the mute function. For example, because the display is off and the phone application display is no longer visible, the user may have no indication that the mute function is activated. In this instance, the user may attempt to participate in the conversation, but the other parties will not hear audio from the user's end due to the mute function being activated. This may be particularly frustrating and embarrassing for the user.

Upon realizing that the mute function remains active, the user must necessarily activate the display and access the user interface and the phone application display in order to deactivate the mute function by selecting the un-mute function. The touch screen displays and user interfaces of some smartphones may be unlocked by any of several well-known unlocking procedures, such as pressing a predefined set of buttons (simultaneously or sequentially), performing a predefined gesture and/or entering a code or password.

However, these unlock procedures may have drawbacks. For example, the button and/or gesture combinations may be frustrating to perform and creating, memorizing, and recalling passwords, codes, and the like can be quite burdensome. In addition to unlocking the phone, a user may be required to navigate the user interface in order to return to the phone application display so as to view the active call display, further delaying a user's ability to un-mute a call. These drawbacks may reduce the ease of use of the unlocking process and, as a consequence, may be time-consuming, particularly when a user needs to quickly un-mute the call. This may be particularly true when a user activates the mute function several times during the duration of a call.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

By way of overview, the present disclosure is generally directed to a system and method for voice and/or video communication between mobile devices. More specifically, a system and method consistent with the present disclosure generally provides management of active voice and/or video calls between a first mobile device and one or more other mobile devices.

A system consistent with the present disclosure includes a first mobile device configured to initiate communication with at least one other mobile device. For example, the communication may be established over a 2G, 3G, and/or 4G cellular connection. Alternatively, the communication may be established over the Internet via a WiFi connection. During an active voice and/or video call, the first mobile device is configured to provide a persistent visual indication to the user of the status of the mute function of the device during the active voice and/or video call. The first mobile device further includes a user interface configured to receive user input in the form of predefined gestures and/or voice commands and allow the user to toggle between mute and un-mute states by way of the predefined gestures and/or voice commands regardless of whether a display of the device is shut off and/or the user interface is locked.

A system and method consistent with the present disclosure provides a user with continual visual indication of the status of the mute function during an active call independent of whether the display is shut off and/or the user interface is locked. Accordingly, the user may be alerted to the fact that a call is muted without having to first activate the display and/or access the user interface to determine the status of the mute function, which generally requires input from the user, such as pressing a predefined set of buttons (simultaneously or sequentially), performing a predefined gesture and/or entering a code or password. Additionally, a system and method consistent with the present disclosure provides the user with the ability to toggle between mute and un-mute states during an active call without having to first activate the display and/or access the user interface. As such, a system and method consistent with the present disclosure provides a more efficient and user-friendly procedure for monitoring and managing the state of an active voice and/or video call, particularly the mute function.

Figure 1:
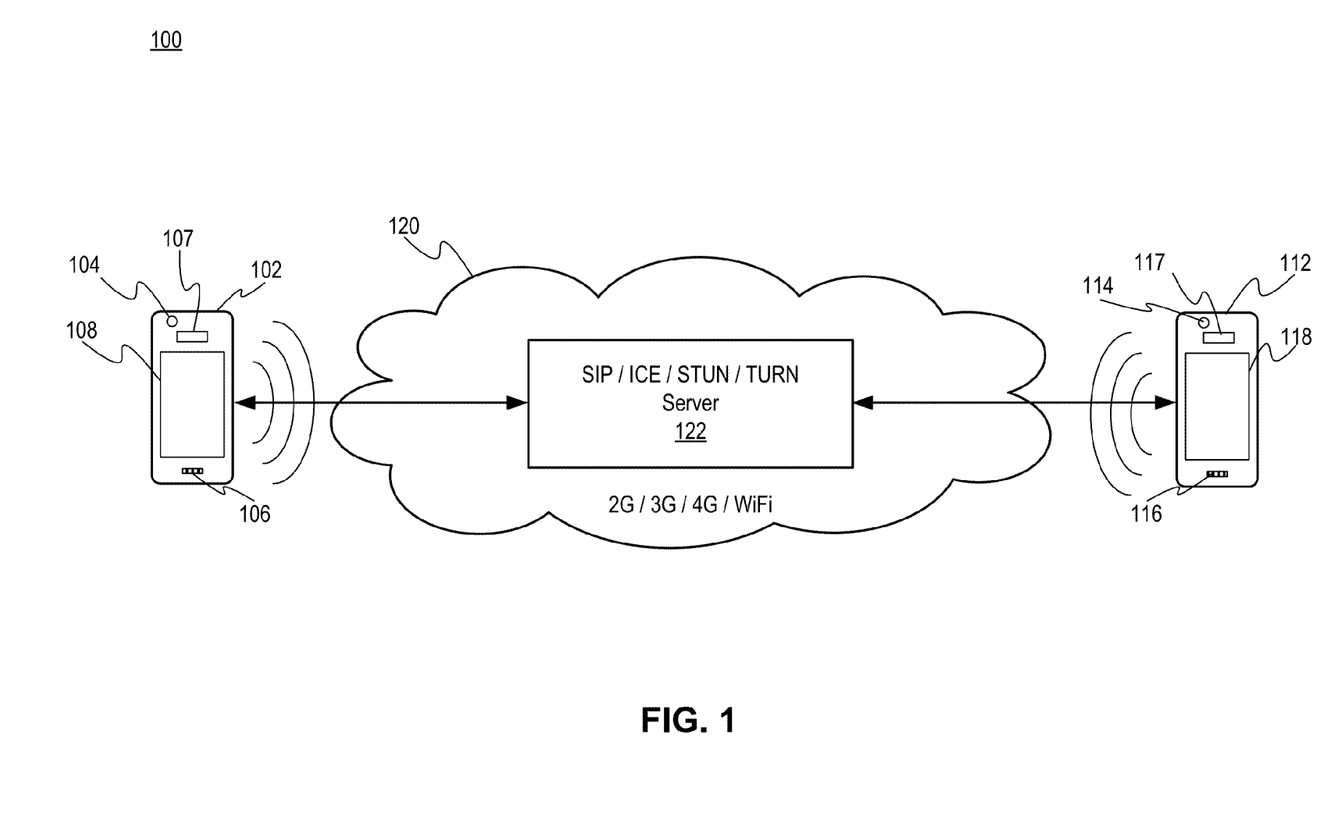
FIG. 1 illustrates an example device-to-device system consistent with various embodiments of the present disclosure.

FIG. 1 illustrates device-to-device system 100 consistent with various embodiments of the present disclosure. The system 100 may generally include a first device 102 and at least one other device 112 communicating via network 120. The first device 102 includes at least a camera 104, microphone 106 and display 108. Device 112 includes at least a camera 114, microphone 116 and display 118. The network 120 includes at least one server 122.

Devices 102 and 112 may include various hardware platforms that are capable of wired and/or wireless communication. For example, devices 102 and 112 may include, but are not limited to, videoconferencing systems, desktop computers, laptop computers, tablet computers, smart phones, (e.g., iPhones®, Android®-based phones, Blackberries®, Symbian®-based phones, Palm®-based phones, etc.), cellular handsets, etc.

Cameras 104 and 114 include any device for capturing digital images representative of an environment that includes one or more persons, and may have adequate resolution for face analysis of the one or more persons in the environment as described herein. For example, cameras 104 and 114 may include still cameras (e.g., cameras configured to capture still photographs) or video cameras (e.g., cameras configured to capture moving images comprised of a plurality of frames). Cameras 104 and 114 may be configured to operate using light in the visible spectrum or with other portions of the electromagnetic spectrum not limited to the infrared spectrum, ultraviolet spectrum, etc. Cameras 104 and 114 may be incorporated within devices 102 and 112, respectively, or may be separate devices configured to communicate with devices 102 and 112 via wired or wireless communication. Specific examples of cameras 104 and 114 may include wired (e.g., Universal Serial Bus (USB), Ethernet, Firewire, etc.) or wireless (e.g., WiFi, Bluetooth, etc.) web cameras as may be associated with computers, video monitors, etc., mobile device cameras (e.g., cell phone or smart phone cameras integrated in, for example, the previously discussed example devices), integrated laptop computer cameras, integrated tablet computer cameras (e.g., iPad®, Galaxy Tab®, and the like), etc.

Devices 102 and 112 may further include microphones 106 and 116. Microphones 106 and 116 include any devices configured to sense sound. Microphones 106 and 116 may be integrated within devices 102 and 112, respectively, or may interact with the devices 102, 112 via wired or wireless communication such as described in the above examples regarding cameras 104 and 114. Devices 102 and 112 may further include speakers 107, 117. The speakers 107, 117 may be configured to reproduce local sounds (e.g., to provide audio feedback of the user's voice, transformed or not) and remote sounds (e.g., the sound(s) of the other part(ies) (transformed or not) engaged in a telephone, video call or interaction).

Displays 108 and 118 include any devices configured to display text, still images, moving images (e.g., video), user interfaces, graphics, etc. Displays 108 and 118 may be integrated within devices 102 and 112, respectively, or may interact with the devices via wired or wireless communication such as described in the above examples regarding cameras 104 and 114. As Network 120 may include various second generation (2G), third generation (3G), fourth generation (4G) cellular-based data communication technologies, Wi-Fi wireless data communication technology, etc. Network 120 includes at least one server 122 configured to establish and maintain communication connections when using these technologies. For example, server 122 may be configured to support Internet-related communication protocols like Session Initiation Protocol (SIP) for creating, modifying and terminating two-party (unicast) and multi-party (multicast) sessions, Interactive Connectivity Establishment Protocol (ICE) for presenting a framework that allows protocols to be built on top of bytestream connections, Session Traversal Utilities for Network Access Translators, or NAT, Protocol (STUN) for allowing applications operating through a NAT to discover the presence of other NATs, IP addresses and ports allocated for an application's User Datagram Protocol (UDP) connection to connect to remote hosts, Traversal Using Relays around NAT (TURN) for allowing elements behind a NAT or firewall to receive data over Transmission Control Protocol (TCP) or UDP connections, etc.

Figure 2:
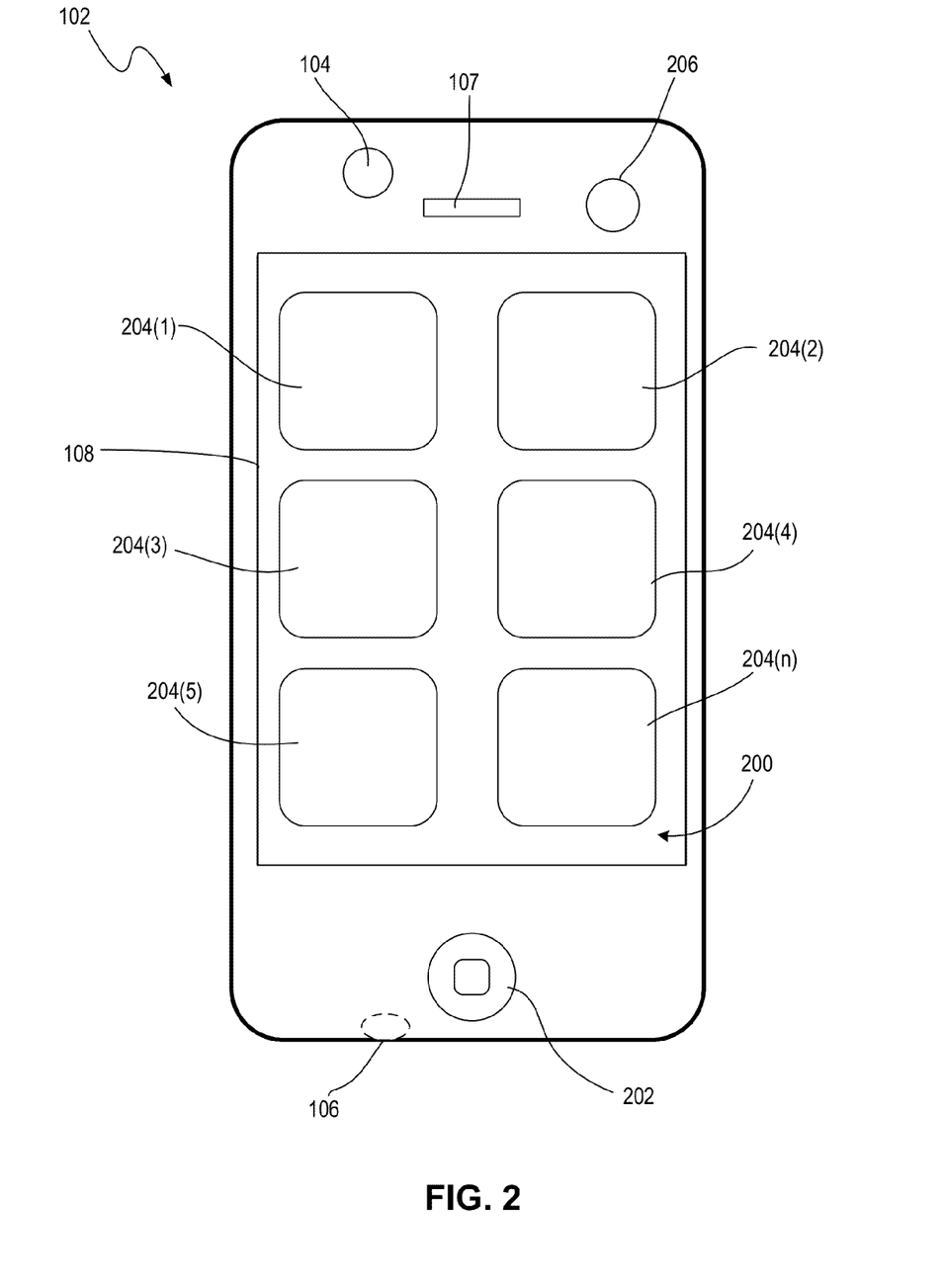
FIG. 2 illustrates an example device consistent with various embodiments of the present disclosure.

FIG. 2 illustrates an example device 102 in accordance with various embodiments of the present disclosure. While only device 102 is described, device 112 (e.g., remote device) may include resources configured to provide the same or similar functions. As described earlier, the device 102 may include a wireless communication device such as a cellular telephone, satellite telephone, cordless telephone, personal digital assistant (PDA), portable computer, or any other device capable of wired and/or wireless communications. In the illustrated embodiment, the device 102 is an exemplary smartphone, and in particular, an Apple® iPhone® available by Apple Inc., of Cupertino, Calif. As previously discussed, device 102 is shown including camera 104, microphone 106, speaker 107 and display 108. As generally understood, device 102 may further include multiple forms of user input configured to allow a user to input spatial data to control operations of the device 102. In one embodiment, the display 108 may be a touch-sensitive display configured to allow a user to control (i.e. navigate) a graphical user interface (GUI) 200 of the device 102 presented on the display 108. In addition to a touch screen, the device may include other forms of user input (e.g. buttons 202, knobs, trackball, etc.) separate from the display 108 allowing the user to navigate the GUI 200.

The device 102 may be configured to support a variety of applications 204(1)-204(n). The applications 204(1)-204(n) may include, but are not limited to, a telephone application, a video conferencing application, an e-mail application, an instant messaging application, a blogging application, a digital camera application, a digital video camera application, a web browsing application, a digital music player application and/or a digital video player application. The various applications 204(1)-204(n) that may be executed on the device 102 may use at least one common physical user interface device, such as the touch screen display 108.

The device 102 may further include a status indicator 206. As described in greater detail herein, the status indicator 206 may be configured to provide a visual indication to a user of the condition of one or more parameters of a running application. The status indicator 206 may include a light source configured to emit light in one or more distinct patterns so as to indicate to the user a variety of conditions of one or more parameters of an actively running application on the device 102. In one embodiment, the light source may include one or more light emitting diodes (LED). It should be noted that other light sources may be used alternatively or in addition to LEDs.

Figure 3:
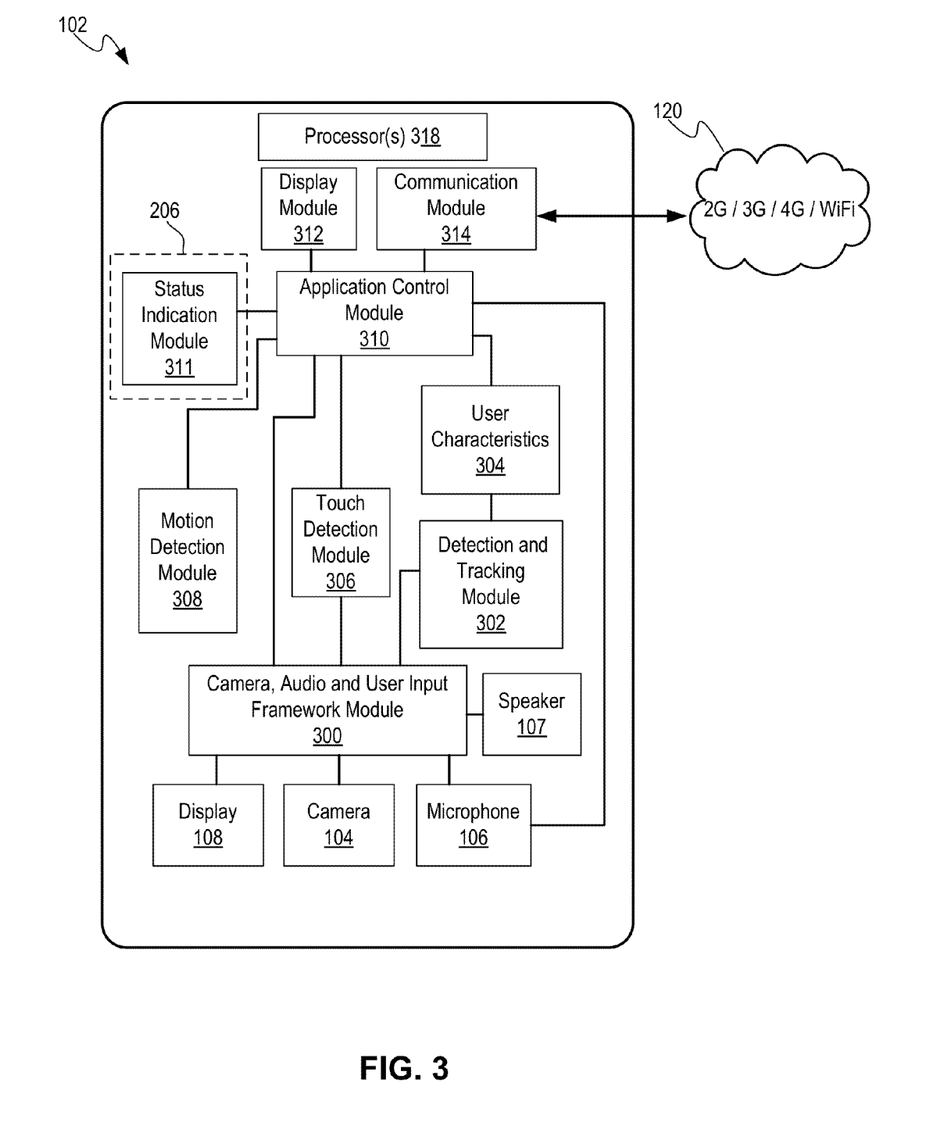
FIG. 3 illustrates the device of FIG. 2 in greater detail.

FIG. 3 illustrates the device 102 of FIG. 2 in greater detail. It should be appreciated that the device 102 shown in FIG. 3 is one example of a device consistent with the present disclosure. As such, a device consistent with the present disclosure may have more or fewer components than shown, may combine two or more components, or a may have a different configuration or arrangement of the components. The various components shown in FIG. 3 may be implemented in hardware, software or a combination of hardware and software, including one or more signal processing and/or application specific integrated circuits.

As shown, the camera 104, microphone 106 and touch-sensitive display 108 may provide input to a camera, audio and user input framework module 300. The camera, audio and user input framework module 300 may include custom, proprietary, known and/or after-developed audio, video processing, and/or user input code (or instruction sets) that are generally well-defined and operable to control at least camera 104, microphone 106 and touch-sensitive display 108. For example, the camera, audio and user input framework module 300 may cause camera 104, microphone 106 and touch-sensitive display 108 to record images, distances to objects, sounds and/or touches, may process images, sounds, audio signal(s) and/or touches, may cause images and/or sounds to be reproduced, etc. The camera, audio and user input framework module 300 may vary depending on device 102, and more particularly, the operating system (OS) running in device 302. Example operating systems include iOS®, Android®, Blackberry® OS, Symbian®, Palm® OS, etc. The speaker 107 may receive audio information from camera, audio and user input framework module 300 and may be configured to reproduce local sounds (e.g., to provide audio feedback of the user's voice, transformed or not) and remote sounds (e.g., the sound(s) of the other part(ies) (transformed or not) engaged in a telephone, video call or interaction in a virtual place).

The device 102 may further include a detection and tracking module 302 configured to identify and track one or more parts of the user, including, but not limited to, the head, face, facial region and/or other parts of a user's body (e.g. hands and/or fingers), within image(s) provided by camera 104. For example, the detection module 302 may include custom, proprietary, known and/or after-developed face detection code (or instruction sets), hardware, and/or firmware that are generally well-defined and operable to receive a standard format image (e.g., but not limited to, a RGB color image) and identify, at least to a certain extent, a face in the image. The detection and tracking module 302 may also be configured to track the detected face through a series of images (e.g., video frames at 24 frames per second) and to determine a head position based on the detected face. Known tracking systems that may be employed by detection/tracking module 302 may include particle filtering, mean shift, Kalman filtering, etc., each of which may utilize edge analysis, sum-of-square-difference analysis, feature point analysis, histogram analysis, skin tone analysis, etc.

It should be noted that the detection module 302 may also include custom, proprietary, known and/or after-developed face detection code (or instruction sets), hardware, and/or firmware that are generally well-defined and operable to receive a standard format image (e.g., but not limited to, a RGB color image) and identify, at least to a certain extent, a hand in the image and track the detected hand through a series of images to determine a hand position based on the detected hand, as described in greater detail herein.

The detection and tracking module 302 may further be configured to recognize features in the face (e.g., the location and/or shape of facial landmarks such as eyes, eyebrows, nose, mouth, etc.) and/or features in the hand (e.g., the location and/or shape of hand landmarks such as fingers, palm, wrist, etc.). The detection and tracking module 302 may include custom, proprietary, known and/or after-developed characteristics recognition code (or instruction sets) that are generally well-defined and operable to receive a standard format image (e.g., but not limited to a RGB color image) from camera 104 and to extract, at least to a certain extent, one or more user characteristics 304 in the image. Such known characteristics systems include, but are not limited to, the CSU Face Identification Evaluation System by Colorado State University, standard Viola-Jones boosting cascade framework, which may be found in the public Open Source Computer Vision (OpenCV™) package.

In one embodiment, user input and control of the GUI 200 may be based directly on identified user characteristics 304, such as, for example, sensed facial actions (e.g., changes in facial features) and or sensed hand actions (e.g., changes in hand features).

The device 102 further includes a touch detection module 306 configured to receive touch data from the camera, audio and user input framework module 300 and to identify the touch event based on the received touch data and generate touch input data. The touch event identifier may include touch type and/or touch location(s) of the touch-sensitive display 108. Touch type may include a single tap, a double tap, a tap and hold, a tap and move, a pinch and stretch, a swipe, etc., to the touch-sensitive display 108. Touch location(s) may include a touch start location, a touch end location and/or intermediate moving touch locations, etc., of the touch-sensitive display 108. The touch locations may correspond to coordinates of touch-sensitive display 108. The touch detection module 306 may include custom, proprietary, known and/or after-developed touch detection code (or instruction sets) that are generally well-defined and operable to receive touch data and to identify a touch event.

The device further includes a motion detection module 308 configured to detect movement of the device 102, including the direction and magnitude of movements. The motion diction module 308 may include known sensors configured to detect or sense motion or position of the device 102. For example, the motion detection module 308 may include, one or more gyroscopes, one or more GPS (global positioning system) trackers, or a combination of these devices. The motion detection module 308 may include custom, proprietary, known and/or after-developed touch detection code (or instruction sets) that are generally well-defined and operable to identify a motion event.

The device 102 further includes an application control module 310 configured to allow a user of device 102 to interact with at least one of the applications 204(1)-204(n). More specifically, the application control module 310 may include an interface configured to allow a user to control one or more parameters of a running application. For example, in the event that a telephone application is running and the user has placed a call from device 102 to device 112, the application control module 310 may be configured to provide the user with a user interface of the active phone call. More specifically, the display module 312 may be configured to display the user interface of the active phone call on the display 108. The user may browse and select from one or more functions, including, but not limited to, place callers on hold, add new callers, conference two callers together, swap between phone lines, as well as mute the microphone 106 during the call.

The application control module 310 is configured to receive user input (e.g., touch input, motion input, voice command, facial and/or hand characteristics, etc.) to allow the user to navigate and select one or more options. For example, the application control module 310 may be configured to receive touch input data from the touch detection module 306, motion input data from the motion detection module 308, voice input data from the microphone 106 and user characteristics 304 (e.g. facial and/or hand characteristics) from the detection module 302.

The application control module 310 may further be configured to communicate with the status indicator 206. More specifically, the status indicator 206 may include a status indication module 311 configured to receive data from the application control module 310 related to the condition of one or more parameters of a running application. In response to receiving the data from the application control module 310, the status indication module 311 may be configured control the status indicator 206 to provide a visual indication of the condition of a condition of at least one of the functions of the active communication.

In the case of an active telephone call, for example, the status indication module 311 may be configured to receive data related to the current state of the mute function. The status indication module 311 may further be configured to control the status indicator 206 to provide a visual indication to a user of the current state of the mute function in response to received data. Depending on the current state of the mute function, the status indicator 206 may emit light in one or more distinct patterns (e.g., distinct flashing pattern, varying intensity, steady emission, etc.). For example, in the event that the mute function is active (i.e., the microphone 106 is muted), the status indicator 206 may emit a flashing light at predetermined intervals. In the event that the mute function is not active (i.e., the microphone 106 is not muted), the status indicator may remain inactive (i.e. no emission of light). It should be noted that a variety of light emission patterns may be used by the status indicator 206 to provide the user with visual indication of the current state of the mute function. For example, the status indicator 206 include a multi-color light source, wherein light having a first color may be emitted when the mute function is active and light having a second color may be emitted when the mute function in inactive.

The device 102 further includes a communication module 314 configured to transmit and receive information between the devices 102, 112. The communication module 314 may include custom, proprietary, known and/or after-developed communication processing code (or instruction sets) that are generally well-defined and operable to transmit and receive audio and video information between devices 102, 112. The communication module 314 transmits and receives the above information via network 320 as previously described.

The device 102 may further include one or more processor(s) 318 configured to perform operations associated with device 102 and one or more of the modules included therein.

Figure 4:
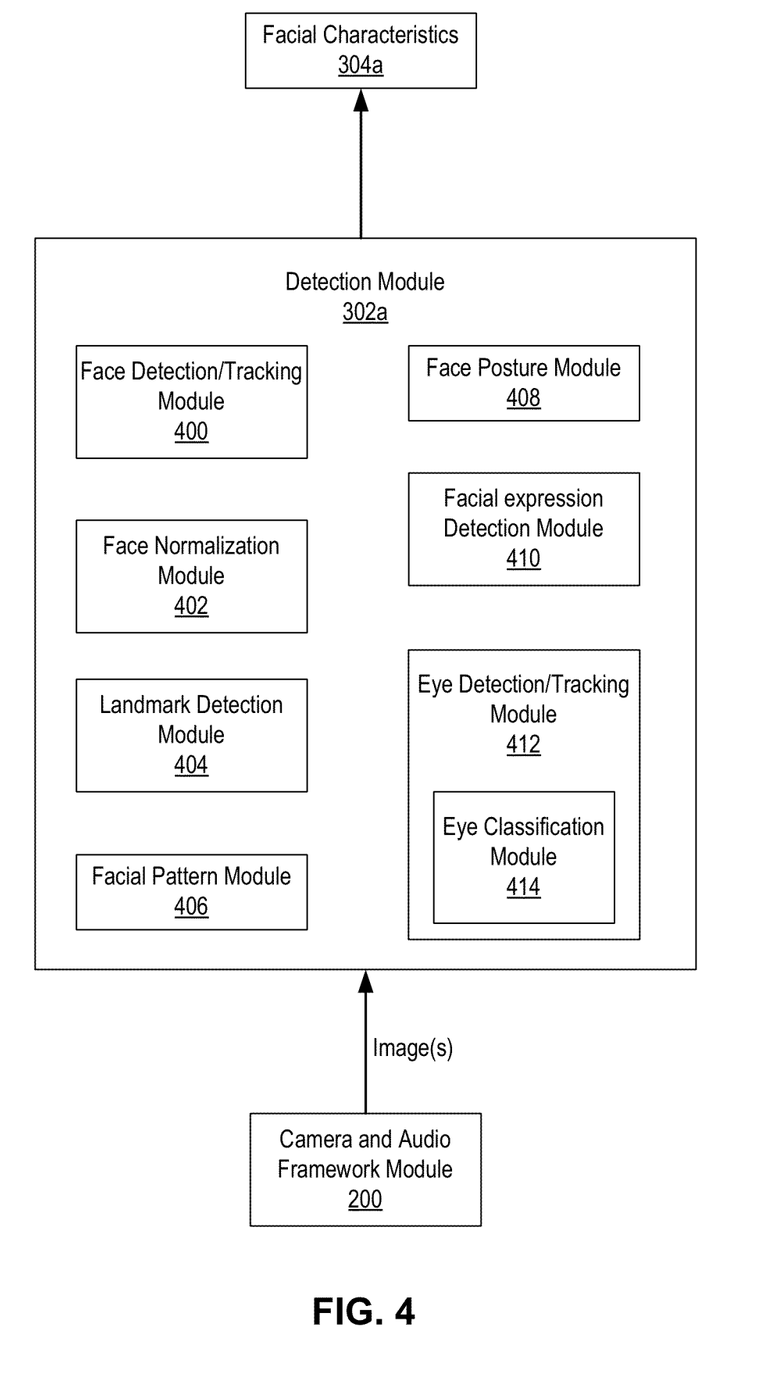
FIG. 4 illustrates one embodiment of a detection module consistent with various embodiments of the present disclosure.

FIG. 4 illustrates one embodiment of a detection and tracking module 302a consistent with various embodiments of the present disclosure. As shown, the detection and tracking module 302a may be configured to identify facial characteristics 304a of the user. The detection module 302a may be configured to receive one or more images from the camera 104 via the camera and audio framework module 300 and identify, at least to a certain extent, a face (or optionally multiple faces) in the image. The detection module 302a may also be configured to identify and determine, at least to a certain extent, one or more facial characteristics 304a in the image. The facial characteristics 304a may be generated based on one or more of the facial parameters identified by the detection module 302a as described herein. The facial characteristics 304a may include may include features of the face, including, but not limited to, the location and/or shape of facial landmarks such as eyes, eyebrows, nose, mouth, etc., as well as movement of the mouth, eyes and/or eyelids.

In the illustrated embodiment, the detection module 302a may include a face detection/tracking module 400, a face normalization module 402, a landmark detection module 404, a facial pattern module 406, a face posture module 408, a facial expression detection module 410, an eye detection/tracking module 412 and an eye classification module 414. The face detection/tracking module 400 may include custom, proprietary, known and/or after-developed face tracking code (or instruction sets) that is generally well-defined and operable to detect and identify, at least to a certain extent, the size and location of human faces in a still image or video stream received from the camera 104. Such known face detection/tracking systems include, for example, the techniques of Viola and Jones, published as Paul Viola and Michael Jones , *Rapid Object Detection using a Boosted Cascade of Simple Features*, Accepted Conference on Computer Vision and Pattern Recognition, 2001. These techniques use a cascade of Adaptive Boosting (AdaBoost) classifiers to detect a face by scanning a window exhaustively over an image. The face detection/tracking module 400 may also track a face or facial region across multiple images.

The face normalization module 402 may include custom, proprietary, known and/or after-developed face normalization code (or instruction sets) that is generally well-defined and operable to normalize the identified face in the image. For example, the face normalization module 402 may be configured to rotate the image to align the eyes (if the coordinates of the eyes are known), crop the image to a smaller size generally corresponding the size of the face, scale the image to make the distance between the eyes constant, apply a mask that zeros out pixels not in an oval that contains a typical face, histogram equalize the image to smooth the distribution of gray values for the non-masked pixels, and/or normalize the image so the non-masked pixels have mean zero and standard deviation one.

The landmark detection module 404 may include custom, proprietary, known and/or after-developed landmark detection code (or instruction sets) that is generally well-defined and operable to detect and identify, at least to a certain extent, the various facial features of the face in the image. Implicit in landmark detection is that the face has already been detected, at least to some extent. Optionally, some degree of localization may have been performed (for example, by the face normalization module 402) to identify/focus on the zones/ areas of the image where landmarks can potentially be found. For example, the landmark detection module 404 may be based on heuristic analysis and may be configured to identify and/or analyze the relative position, size, and/or shape of the eyes (and/or the corner of the eyes), nose (e.g., the tip of the nose), chin (e.g. tip of the chin), cheekbones, and jaw. The eye-corners and mouth corners may also be detected using Viola-Jones based classifier.

The facial pattern module 306 may include custom, proprietary, known and/or after-developed facial pattern code (or instruction sets) that is generally well-defined and operable to identify and/or generate a facial pattern based on the identified facial landmarks in the image. As may be appreciated, the facial pattern module 406 may be considered a portion of the face detection/tracking module 400.

The face posture module 408 may include custom, proprietary, known and/or after-developed facial orientation detection code (or instruction sets) that is generally well-defined and operable to detect and identify, at least to a certain extent, the posture of the face in the image. For example, the face posture module 408 may be configured to establish the posture of the face in the image with respect to the display 108 of the device 102. More specifically, the face posture module 408 may be configured to determine whether the user's face is directed toward the display 108 of the device 102, thereby indicating whether the user is observing the content being displayed on the display 108.

The facial expression detection module 410 may include custom, proprietary, known and/or after-developed facial expression detection and/or identification code (or instruction sets) that is generally well-defined and operable to detect and/or identify facial expressions of the user in the image. For example, the facial expression detection module 410 may determine size and/or position of the facial features (e.g., eyes, mouth, cheeks, teeth, etc.) and compare the facial features to a facial feature database which includes a plurality of sample facial features with corresponding facial feature classifications.

The eye detection/tracking module 412 may include custom, proprietary, known and/or after-developed eye tracking code (or instruction sets) that is generally well-defined and operable to detect and identify, at least to a certain extent, eye movement and/or eye gaze or focus of the user in the image. Similar to the face posture module 408, the eye detection/tracking module 412 may be configured to establish the direction in which the user's eyes are directed with respect to the display 108 of the device 102. The eye detection/tracking module 412 may be further configured to establish eye blinking of a user.

As shown, the eye detection/tracking module 412 may include an eye classification module 414 configured to determine whether the user's eyes (individually and/or both) are open or closed and movement of the user's eyes with respect to the display 108. In particular, the eye classification module 414 is configured to receive one or more normalized images (images normalized by the normalization module 402). A normalized image may include, but is not limited to, rotation to align the eyes (if the coordinates of the eyes are known), cropping of the image, particularly cropping of the eyes with reference to the eye-corner position, scaling the image to make the distance between the eyes constant, histogram equalizing the image to smooth the distribution of gray values for the non-masked pixels, and/or normalizing the image so the non-masked pixels have mean zero and a unit standard deviation.

Upon receipt of one or more normalized images, the eye classification module 414 may be configured to separately identify eye opening/closing and/or eye movement (e.g. looking left/right, up/down, diagonally, etc.) with respect to the display 408 and, as such, determine a status of the user's eyes in real-time or near real-time during active video communication and/or interaction. The eye classification module 414 may include custom, proprietary, known and/or after-developed eye tracking code (or instruction sets) that is generally well-defined and operable to detect and identify, at least to a certain extent, movement of the eyelids and eyes of the user in the image. In one embodiment, the eye classification module 414 may use statistical-based analysis in order to identify the status of the user's eyes (open/close, movement, etc.), including, but not limited to, linear discriminant analysis (LDA), artificial neural network (ANN) and/or support vector machine (SVM). During analysis, the eye classification module 414 may further utilize an eye status database, which may include a plurality of sample eye features with corresponding eye feature classifications.

As previously described, the application control module 310 is configured to receive user characteristics 304, including facial characteristics 304a, and allow the user to navigate and select one or more options of a running application based on the user characteristics 304a. A user may control the mute function during a telephone call based on facial characteristics 304a. In one embodiment, the application control module 310 may be configured to allow a user to toggle between mute and un-mute conditions based on the status of a user's eyes. For example, the mute function may be controlled based on a predefined number of blinks (e.g. blink once activates mute function and blink twice deactivates mute function). The mute function may be controlled based on other predefined conditions of the facial characteristics 304a, including, but not limited to, eye movement, direction of eye gaze, facial expressions, mouth movement, etc.

Figure 5:
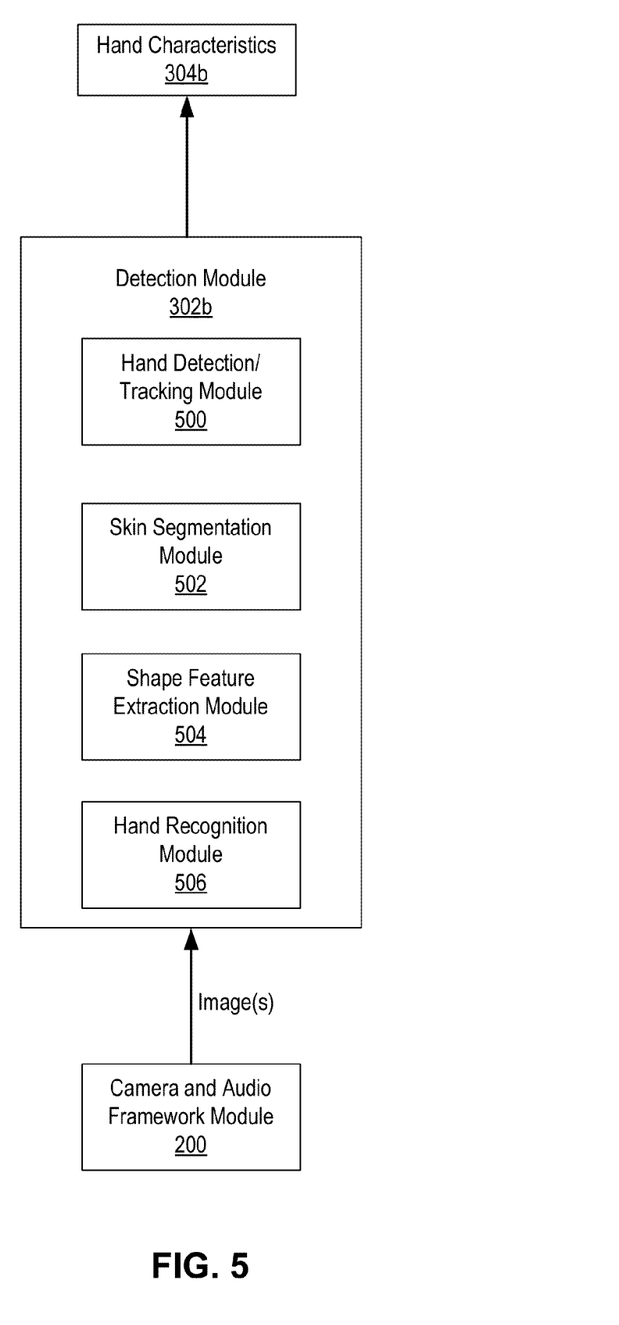
FIG. 5 illustrates another embodiment of a detection module consistent with various embodiments of the present disclosure.

FIG. 5 illustrates one embodiment of a detection and tracking module 302b consistent with various embodiments of the present disclosure. As shown, the detection and tracking module 302b may be configured to identify hand characteristics 304b of the user. The detection module 302b may be generally configured to track a hand region through a series of images (e.g., video frames at 24 frames per second). The detection module 302b may include a hand detection and tracking module 500 which may include custom, proprietary, known and/or after-developed tracking code (or instruction sets) that are generally well-defined and operable to receive a series of images (e.g., RGB color images) and track, at least to a certain extent, a hand in the series of images. Such known tracking systems include particle filtering, optical flow, Kalman filtering, etc., each of which may utilize edge analysis, sum-of-square-difference analysis, feature point analysis, mean-shifting techniques (or derivatives thereof), etc.

The hand detection module 302b may also include a skin segmentation module 502 generally configured to identify the skin colors of a hand within a hand region of an image (defined by the hand detection and tracking module 500). The skin segmentation module 502 may include custom, proprietary, known and/or after-developed skin identification code (or instruction sets) that are generally well-defined and operable to distinguish skin tones or colors from other areas of the hand region. Such known skin identification systems include thresholding on hue-saturation color components, HSV color statistics, color-texture modeling, etc. In one example embodiment, the skin segmentation module 502 may use a generalized statistical skin color model, such as a multi-variable Gaussian model (and derivatives thereof).

The detection module 302b may also include a shape feature extraction module 504 generally configured to identify one or more shape features of the hand in the binary image generated by the skin segmentation module 502. The shape features, generally, include intrinsic properties and/or "markers" of the hand shape in the binary image, and may be used to improve the efficiency hand gesture recognition module 506 to identify a hand gesture in the image. Shape features may include, for example, eccentricity, compactness, orientation, rectangularity, width center, height center, the number of defects, difference between left and right parts, difference between top and bottom parts, etc.

For example, the hand gesture recognition module 506 may be generally configured to identify the hand gesture with a hand region of an image, based on the hand shape features identified by the shape feature extraction module 504, for example, as described below. The hand gesture recognition module 506 may include custom, proprietary, known and/or after-developed skin identification code (or instruction sets) that are generally well-defined and operable to identify a hand gesture within an image. Known hand gesture recognition systems that may be used according to the teachings of the present disclosure include, for example, pattern recognition systems, Perseus models (and derivatives thereof), Hidden Markov models (and derivatives thereof), support vector machine, linear discriminate analysis, decision tree, etc. For example, the hand gesture recognition module 506 may use a multilayer perceptron (MLP) model, or derivative thereof, that iteratively maps one or more inputs onto one or more outputs. The general framework for the MLP model is known and well-defined, and generally includes a feedforward neural network that improves on a standard linear preceptron model by distinguishing data that is not linearly separable. In this example, the inputs to the MLP model may include one or more shape features generated by the shape feature extraction module 504 as described above.

The output of the hand gesture recognition module 506 may include a signal or data set indicative of the type of hand gesture identified. This, in turn, may be used to generate a portion of the consumer characteristic data 30. Example of hand gestures that may be captured by the camera 104 may include thumbs up, thumbs down, an "OK" sign, a stop and a go hand, and hand waves. These are not intended to be an exhaustive list of the types of hand gestures that may be used with the present disclosure. Similar to the facial characteristics 304a described above, the application control module 310 may receive the hand characteristics 304b and, in turn, allow the user to navigate and select one or more options of a running application based on the hand characteristics.

Figure 6A:
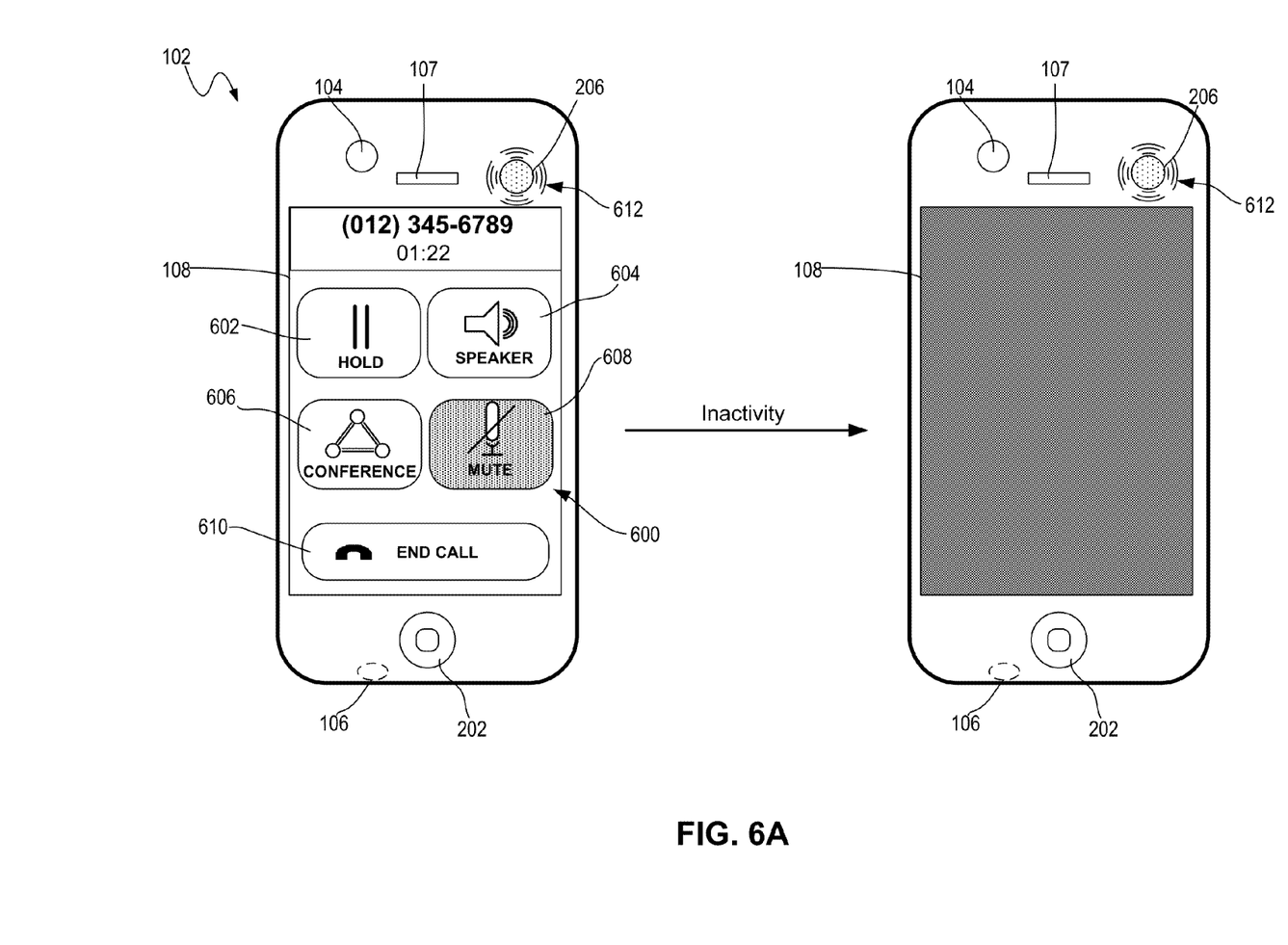
FIGS. 6A and 6B illustrate an exemplary method of transitioning the device from a muted condition to an un-muted condition during an active phone call consistent with various embodiments of the present disclosure.
Figure 6B:
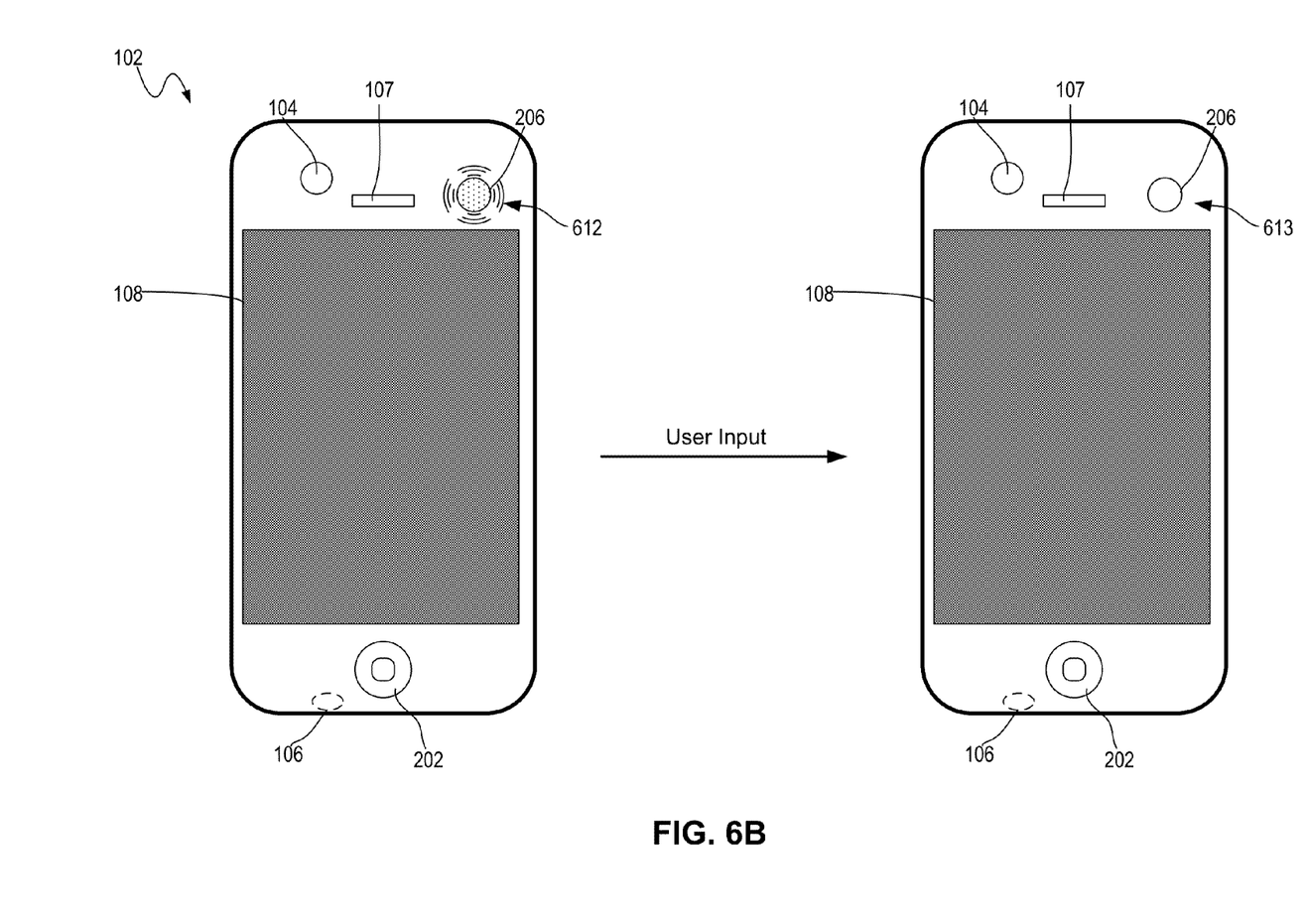

FIGS. 6A and 6B illustrate an exemplary method of transitioning the device 102 from a muted condition to an un-muted condition during an active phone call consistent with various embodiments of the present disclosure. FIG. 6A illustrates the device 102 during an active phone call, wherein a user interface 600 of the active phone call may be presented to the user via the display 108. A user may browse and select from one or more options displayed, including, but not limited to, place callers on hold 602, place the call on speakerphone 604, conference callers together 606, mute 608 the microphone 106 and end the call 610.

Generally, the user interface 600 may be configured to provide visual indication to the user of one or more selected options. As shown, for example, upon selecting the mute function 608, the user interface 600 may visually indicate to the user that the mute function 608 is activated by changing the appearance of the mute function icon (e.g., but not limited to background color change). As previously described, upon selecting the mute function 608, the status indicator 206 may further provide a visual indication (e.g. light 612) to the user of the current state of the mute function during an active phone call. In this instance, the device 102 may provide the user with an indication of the state of the mute function 608 by way of the user interface 600 of the display 108, as well as the status indicator 206.

As generally understood, the device 102 may be configured to conserve battery energy during use. More specifically, one or more functions of the device 102 may be selectively shut off, stopped, etc. after a period of inactivity. For example, the device 102 may include a timer for monitoring how much time has elapsed since the user has interacted with the user interface 600 during an active call. As shown, when the elapsed time reaches a predefined threshold, the device 102 may be configured to shut off (or dim) the display 108 and/or transition the user interface 600 to a locked state. As such, the user interface 600 is not visible to the user, however the call may still remain active in which the user may communicate with (e.g. speak with and listen to) other callers. Although the user interface 600 of the active phone call is no longer visible to the user, the status indicator 206 is configured to provide visual indication of the state of the mute function 608 to the user (the status indicator 206 is separate from the display 108 and is thus independent of the condition of the display 108). As such, the user is continually provided with the current condition of the mute function by way of the status indicator 206 regardless of whether the display 108 is shut off and/or the user interface 600 is locked.

FIG. 6B illustrates the device 102 transitioning from a muted state to an un-muted state when the display 108 is shut-off and/or user interface 600 is locked during an active phone call. Although the display 108 may be shut off and the user interface 600 may be locked, a user may toggle between mute and un-mute states by way of predefined gestures and/or voice commands without having to activate the display 108 and/or unlock the user interface 600. More specifically, the application control module 310 may receive user input (e.g., touch input, motion input, voice command, facial and/or hand characteristics, etc.) to allow the user to toggle between mute and un-mute states during the active phone call, even when the display 108 is shut off and/or the user interface 600 is locked.

A user may toggle between mute and un-mute states by performing one or more predefined forms of user input. For example, the application control module 310 may be configured to toggle between mute and un-mute states based on touch input data from the touch detection module 306, such as, for example, a single tap, a double tap, a tap and hold, a tap and move, a pinch and stretch, a swipe, etc., to the touch screen. The application control module 310 may further be configured to toggle between mute and un-mute states based on motion input data from the motion detection module 308, such as, for example, shaking of the device 102 or moving the device 102 in a predefined pattern. The application control module 310 may further be configured to toggle between mute and un-mute states based on voice input data from the microphone 106, such as, for example, predefined voice commands (e.g., "mute", "un-mute", etc.).

The application control module 310 may further be configured to toggle between mute and un-mute states based on user characteristics 304 from the detection module 302. For example, a user may toggle between mute and un-mute states based on hand characteristics 304b, such as, for example, a hand wave in a predefined pattern, arrangement of fingers, etc. Similarly, a user may toggle between mute and un-mute states based on facial characteristics 304a, such as, for example, eye movement, eyelid movement (e.g. blinking), etc. As shown, upon toggling between mute and un-mute states, the status indicator 206 may provide the user with visual indication (e.g. lights off 613) that the mute function is no longer active.

Figure 7:
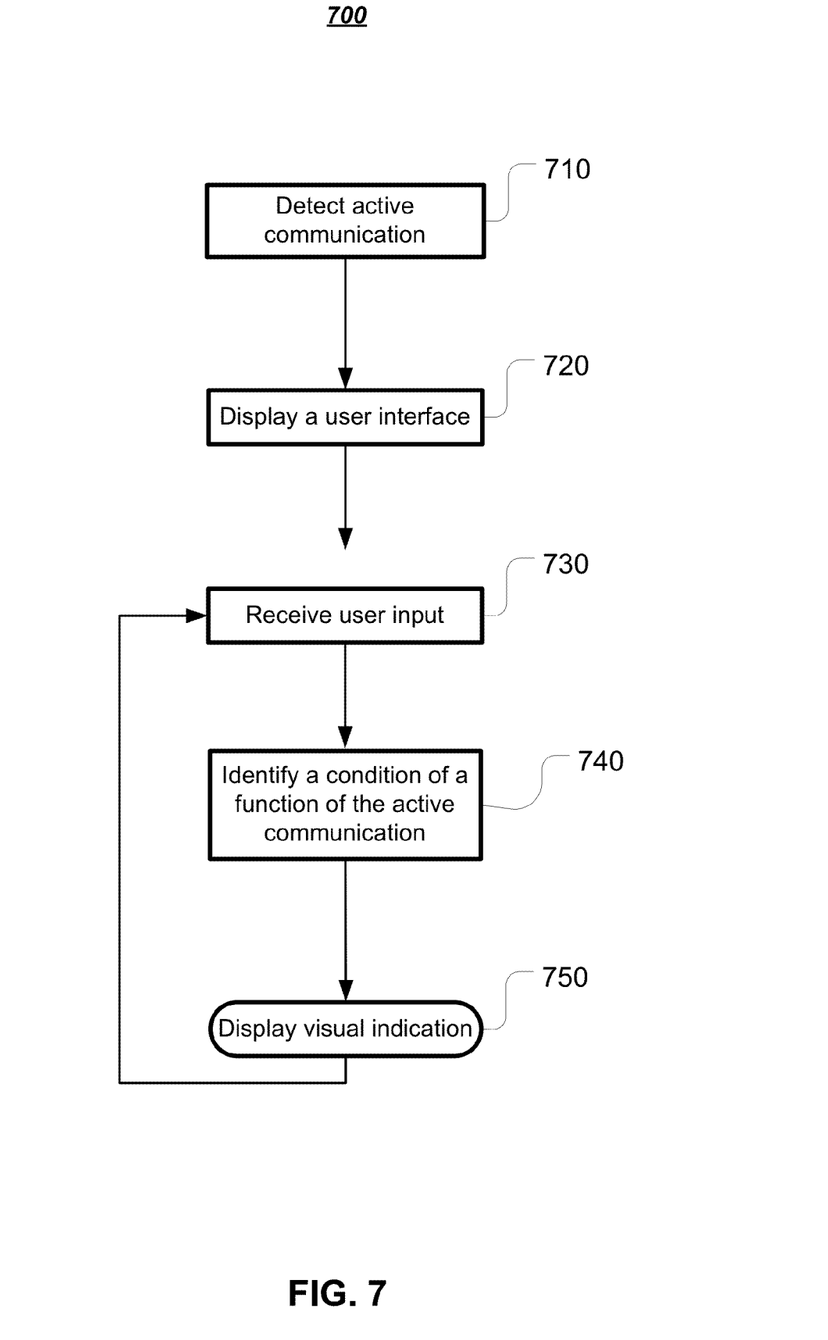
FIG. 7 is a flow diagram illustrating one embodiment for managing an active communication in accordance with at least one embodiment of the present disclosure.

FIG. 7 is a flow diagram of one embodiment of a method 700 for managing an active communication is illustrated. The method 700 includes detecting active communication between a first user device and a remote user device (operation 610). The active communication may include, for example, an active phone call or an active video call. The method 700 further includes displaying a user interface on a display of the first user device (operation 720). The user interface is configured to provide one or more functions related to the active communication between first and remote user devices. User input may be received by the first user device (operation 730). The user input may be used to select from the one or more conditions of one or more of the functions of the active call on the user interface.

One or more conditions of a function may be identified (operation 740) and a visual indication may be displayed (operation 750). More specifically, the first user device may include a status indicator configured to identify at least one condition of a function of the active communication. The status indicator may further be configured to display a visual indication representative of the identified condition.

While FIG. 7 illustrates method operations according various embodiments, it is to be understood that in any embodiment not all of these operations are necessary. Indeed, it is fully contemplated herein that in other embodiments of the present disclosure, the operations depicted in FIG. 7 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect, there is provided a first user device configured to allow gesture-based management of an active communication between the first user device and a remote user device. The first user device includes a display for displaying a user interface for one or more communication applications. The first user device further includes a communication module configured to initiate communication between the first user device and the remote user device in response to selection of one of the communication applications. The first user device further includes an application control module configured to provide a second user interface on the touch screen display during active communication between the first user device and the remote user device. The second user interface is configured to provide one or more functions related to the active communication. The application control module is configured to receive user input and control one or more conditions of at least one of the functions based on the user input The first user device further includes a status indicator configured to communicate with the application control module and provide a visual indication of the one or more conditions of the at least one of the functions. The status indicator is configured to provide the visual indication and the application control module is configured to control the one or more conditions of the at least one of the functions independent of illumination of the display.

Another example first user device includes the foregoing components and the status indicator includes a light source configured to emit light in response to at least one condition of the at least one function.

Another example first user device includes the foregoing components and the communication application includes a phone application and said at least one function comprises a mute function.

Another example first user device includes the foregoing components and the one or more conditions include a mute state and an un-mute state.

Another example first user device includes the foregoing components and the user input is at least one of a touch event, a motion event, a voice event, facial characteristics of the user and hand characteristics of the user.

Another example first user device includes the foregoing components and further includes a touch detection module configured to generate touch input data in response to one or more touch events on the display and to transmit the touch input data to the application control module.

Another example first user device includes the foregoing components and further includes a motion detection module configured to generate motion input data in response to one or more motion events to the first user device and to transmit the motion input data to the application control module.

Another example first user device includes the foregoing components and further includes a face detection module configured to detect a facial region in an image of the user and to detect and identify one or more facial characteristics of the face, the facial characteristics comprising at least one of eye gaze, eye movement and eyelid movement of the user.

Another example first user device includes the foregoing components and further includes a hand detection module configured detect a hand region in an image of the user and to detect and identify one or more hand characteristics of the hand, the hand characteristics comprising at least one of a hand gesture and a hand motion.

According to another aspect there is provided at least one computer accessible medium including instructions stored thereon. When executed by one or more processors, the instructions may cause a computer system to perform operations for gesture-based management of an active communication between a first user device and a remote user device. The operations include detecting, by a first user device, active communication between the first user device and a remote user device, displaying a user interface on a display of the first user device, the user interface providing one or more functions related to the active communication between the first user device and the remote user device, receiving, by an application control module of the first user device, user input, controlling, by the application control module of the first user device, one or more conditions of at least one of the functions based on the user input, identifying, by a status indicator of the first user device, a condition of the at least one of the functions and displaying, by the status indicator of the first user device, a visual indication of the identified condition.

Another example computer accessible medium includes the foregoing operations and the controlling one or more conditions of at least one of the functions and the displaying of the visual indication of the identified condition are independent of illumination of the display of the first user device.

Another example computer accessible medium includes the foregoing operations and the displaying a visual indication of the identified condition includes emitting light from a light source.

Another example computer accessible medium includes the foregoing operations and the at least one function includes a mute function and the one or more conditions includes a mute state and an un-mute state.

Another example computer accessible medium includes the foregoing operations and the user input is selected from the group consisting of a touch event, a motion event, a voice event, facial characteristics of the user and hand characteristics of the user.

Another example computer accessible medium includes the foregoing operations and further includes generating, by a touch detection module, touch input data in response to one or more touch events on the display of the first user device and transmitting, by the touch detection module, the touch input data to the application control module.

Another example computer accessible medium includes the foregoing operations and further includes generating, by a motion detection module, motion input data in response to one or more motion events to the first user device and transmitting, by the motion detection module, the motion input data to the application control module.

Another example computer accessible medium includes the foregoing operations and further includes detecting, by a face detection module, a facial region in an image of the user and detecting and identifying, by the face detection module, one or more facial characteristics of the face, the facial characteristics selected from the group consisting of eye gaze, eye movement and eyelid movement of the user.

Another example computer accessible medium includes the foregoing operations and further includes detecting, by a hand detection module, a hand region in an image of the user and detecting and identifying, by the hand detection module, one or more hand characteristics of the hand, the hand characteristics selected from a hand gesture and a hand motion.

According to another aspect there is provided a method for gesture-based management of an active communication between a first user device and a remote user device. The method includes detecting, by the first user device, active communication between the first user device and the remote user device. The method further includes displaying a user interface on a display of the first user device, the user interface providing one or more functions related to the active communication between the first user device and the remote user device. The method further includes receiving, by an application control module of the first user device, user input and controlling, by the application control module of the first user device, one or more conditions of at least one of the functions based on the user input. The method further includes identifying, by a status indicator of the first user device, a condition of the at least one of the functions and displaying, by the status indicator of the first user device, a visual indication of the identified condition.

Another example method includes the foregoing operations and the status indicator is configured to provide the visual indication of the identified condition and the application control module is configured to control the one or more conditions of the at least one of the functions independent of illumination of the display.

Another example method includes the foregoing operations and displaying the visual indication of the identified condition includes emitting light from a light source.

Another example method includes the foregoing operations and the at least one function includes a mute function and the one or more conditions includes a mute state and an un-mute state.

Another example method includes the foregoing operations and the user input is at least one of a touch event, a motion event, a voice event, facial characteristics of the user and hand characteristics of the user.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A first user device configured to allow gesture-based management of an active communication between said first user device and a remote user device, said first user device comprising:
   a display for displaying a first user interface for one or more communication applications;
   a communication module configured to initiate communication between said first user device and said remote user device in response to selection of one of said communication applications;
   an application control module configured to provide a second user interface on said touch screen display during active communication between said first user device and said remote user device, said second user interface providing one or more functions related to said active communication, said application control module being configured to receive user input and control one or more conditions of at least one of said functions based on said user input; and
   a status indicator configured to communicate with said application control module and provide a visual indication of said one or more conditions of said at least one of said functions;
   wherein said status indicator is configured to provide said visual indication independent of illumination of said display and said application control module is configured to receive said user input and control said one or more conditions of said at least one of said functions independent of illumination of said display.

2. The first user device of claim 1, wherein said status indicator comprises a light source configured to emit light in response to at least one condition of said at least one function.

3. The first user device of claim 1, wherein said communication application comprises a phone application and said at least one function comprises a mute function.

4. The first user device of claim 3, wherein said one or more conditions comprises a mute state and an un-mute state.

5. The first user device of claim 1, wherein said user input is selected from the group consisting of a touch event, a motion event, a voice event, facial characteristics of said user and hand characteristics of said user.

6. The first user device of claim 5, further comprising a touch detection module configured to generate touch input data in response to one or more touch events on said display and to transmit said touch input data to said application control module.

7. The first user device of claim 5, further comprising a motion detection module configured to generate motion input data in response to one or more motion events to said first user device and to transmit said motion input data to said application control module.

8. The first user device of claim 5, further comprising a face detection module configured to detect a facial region in an image of said user and to detect and identify one or more facial characteristics of said face, said facial characteristics comprising at least one of eye gaze, eye movement and eyelid movement of said user.

9. The first user device of claim 5, further comprising a hand detection module configured detect a hand region in an image of said user and to detect and identify one or more hand characteristics of said hand, said hand characteristics comprising at least one of a hand gesture and a hand motion.

10. At least one non-transient computer accessible medium storing instructions which, when executed by a machine, cause the machine to perform operations comprising:
    detecting, by a first user device, active communication between said first user device and a remote user device;
    displaying a user interface on a display of said first user device, said user interface providing one or more functions related to said active communication between said first user device and said remote user device;
    receiving, by an application control module of said first user device, user input;
    controlling, by said application control module of said first user device, one or more conditions of at least one of said functions based on said user input;
    identifying, by a status indicator of said first user device, a condition of said at least one of said functions; and
    displaying, by said status indicator of said first user device, a visual indication of said identified condition;
    wherein said receiving, said controlling, and said displaying are each independent of illumination of said display of said first user device.

11. The non-transient computer accessible medium of claim 10, wherein said displaying a visual indication of said identified condition comprises emitting light from a light source.

12. The non-transient computer accessible medium of claim 10, wherein said at least one function comprises a mute function and said one or more conditions comprises a mute state and an un-mute state.

13. The non-transient computer accessible medium of claim 10, wherein said user input is selected from the group consisting of a touch event, a motion event, a voice event, facial characteristics of said user and hand characteristics of said user.

14. The non-transient computer accessible medium of claim 13, further comprising:
- generating, by a touch detection module, touch input data in response to one or more touch events on said display of said first user device; and
- transmitting, by said touch detection module, said touch input data to said application control module.

15. The non-transient computer accessible medium of claim 13, further comprising:
- generating, by a motion detection module, motion input data in response to one or more motion events to said first user device; and
- transmitting, by said motion detection module, said motion input data to said application control module.

16. The non-transient computer accessible medium of claim 13, further comprising:
- detecting, by a face detection module, a facial region in an image of said user; and
- detecting and identifying, by said face detection module, one or more facial characteristics of said face, said facial characteristics selected from the group consisting of eye gaze, eye movement and eyelid movement of said user.

17. The non-transient computer accessible medium of claim 13, further comprising:
- detecting, by a hand detection module, a hand region in an image of said user; and
- detecting and identifying, by said hand detection module, one or more hand characteristics of said hand, said hand characteristics selected from a hand gesture and a hand motion.

18. A method for gesture-based management of an active communication between a first user device and a remote user device, said method comprising:
- detecting, by said first user device, active communication between said first user device and said remote user device;
- displaying a user interface on a display of said first user device, said user interface providing one or more functions related to said active communication between said first user device and said remote user device;
- receiving, by an application control module of said first user device, user input;
- controlling, by said application control module of said first user device, one or more conditions of at least one of said functions based on said user input;
- identifying, by a status indicator of said first user device, a condition of said at least one of said functions; and
- displaying, by said status indicator of said first user device, a visual indication of said identified condition;
- wherein said status indicator is configured to provide said visual indication of said identified condition independent of illumination of said display and said application control module is configured to receive user input and control said one or more conditions of at least one of said functions independent of illumination of said display.

19. The method of claim 18, wherein displaying said visual indication of said identified condition comprises emitting light from a light source.

20. The method of claim 18, wherein said at least one function comprises a mute function and said one or more conditions comprises a mute state and an un-mute state.

21. The method of claim 18, wherein said user input is selected from the group consisting of a touch event, a motion event, a voice event, facial characteristics of said user and hand characteristics of said user.

\* \* \* \* \*